United States Patent
Takemori et al.

(10) Patent No.: US 9,215,799 B2
(45) Date of Patent: Dec. 15, 2015

(54) TERMINAL UNIT

(71) Applicant: PANASONIC INTELLECTUAL PROPERTY MANAGEMENT CO., LTD., Osaka (JP)

(72) Inventors: Shunjiro Takemori, Fukuoka (JP); Shigeru Narakino, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/684,857

(22) Filed: Apr. 13, 2015

(65) Prior Publication Data

US 2015/0223327 A1 Aug. 6, 2015

Related U.S. Application Data

(63) Continuation of application No. 13/596,762, filed on Aug. 28, 2012, now Pat. No. 9,036,366.

(30) Foreign Application Priority Data

Sep. 6, 2011 (JP) ................................. 2011-194187

(51) Int. Cl.
*H05K 1/02* (2006.01)
*G06F 21/86* (2013.01)
(Continued)

(52) U.S. Cl.
CPC .............. *H05K 1/0275* (2013.01); *G06F 21/86* (2013.01); *H05K 1/0213* (2013.01);
(Continued)

(58) Field of Classification Search
CPC ....... H05K 1/028; H05K 13/00; H05K 3/361; H05K 7/02; H05K 1/0296; H05K 1/11; H05K 3/30; H05K 5/0247; H05K 9/0064; H05K 1/0277; H05K 1/0281; H05K 1/118; H05K 1/147; H05K 2201/09245; H05K 2201/2009; H05K 3/0094; H05K 3/12; H05K 5/0217; H05K 9/0022; H01R 12/79; H01R 12/62; H01R 12/7082; H01R 12/712; H01R 13/46; G02B 6/4281; G06T 2207/30141; H01B 13/0013; H02K 5/04

USPC ............ 361/748, 752, 679.01, 722, 757, 760, 361/767, 796, 803, 809, 816; 174/254, 250, 174/251, 50, 535; 439/67

See application file for complete search history.

(56) References Cited

U.S. PATENT DOCUMENTS 3,940,786 A * 2/1976 Scheingold et al. .......... 257/773
4,354,720 A * 10/1982 Bakermans .................... 439/357
(Continued)

FOREIGN PATENT DOCUMENTS

JP 61-219926 9/1986
JP 3-105538 5/1991
(Continued)

OTHER PUBLICATIONS

ISR mail date is Nov. 21, 2012.
(Continued)

*Primary Examiner* — Robert J Hoffberg
*Assistant Examiner* — Michael Matey
(74) *Attorney, Agent, or Firm* — Greenblum & Bernstein, P.L.C.

(57) ABSTRACT

The terminal unit includes a main board, electronic components implemented on the main board, a sub-board covering above the electronic components and a frame member so disposed between the main board and the sub-board as to surround the electronic components. A flexible printed circuit covers an outer side of a wall portion of the frame member and is so wound around the frame member from upper and lower sides of the wall portion as to cover at least a part of an inner side of the wall portion. A wiring pattern formed on the flexible printed circuit is electrically connected to the electronic components, and information to be protected that is stored on the electronic components becomes unreadable if the wiring pattern is cut off or short-circuited.

15 Claims, 5 Drawing Sheets

(51) Int. Cl.
*H05K 5/02* (2006.01)
*H05K 1/14* (2006.01)

(52) U.S. Cl.
CPC ............. *H05K 5/0208* (2013.01); *H05K 1/141* (2013.01); *H05K 1/147* (2013.01); *H05K 2201/0314* (2013.01); *H05K 2201/047* (2013.01); *H05K 2201/056* (2013.01); *H05K 2201/2018* (2013.01); *H05K 2203/178* (2013.01)

(56) References Cited

U.S. PATENT DOCUMENTS

| | | | | |
|---|---|---|---|---|
| 4,359,222 | A | * | 11/1982 | Smith, III et al. .... H05K 5/0256 340/384.3 |
| 4,395,084 | A | * | 7/1983 | Conrad ........................ 439/331 |
| 4,449,770 | A | * | 5/1984 | Grabbe et al. ................... 439/68 |
| 4,504,887 | A | * | 3/1985 | Bakermans et al. .......... 361/758 |
| 4,647,124 | A | * | 3/1987 | Kandybowski ................. 439/71 |
| 4,655,519 | A | * | 4/1987 | Evans et al. ..................... 439/74 |
| 4,810,917 | A | | 3/1989 | Kumar et al. |
| 4,873,615 | A | * | 10/1989 | Grabbe ........................ 361/742 |
| 5,159,629 | A | | 10/1992 | Double et al. |
| 5,199,889 | A | * | 4/1993 | McDevitt, Jr. ................. 439/66 |
| 6,279,825 | B1 | | 8/2001 | Yokoyama |
| 6,853,093 | B2 | | 2/2005 | Cohen et al. |
| 7,459,838 | B2 | | 12/2008 | Kim et al. |
| 7,625,216 | B2 | * | 12/2009 | Mendenhall et al. .......... 439/66 |
| 7,679,931 | B2 | | 3/2010 | Kim |
| 8,238,095 | B2 | * | 8/2012 | McNicoll et al. ....... G06F 21/75 361/654 |
| 8,251,712 | B2 | | 8/2012 | Cheng |
| 2002/0074157 | A1 | | 6/2002 | Kato et al. |
| 2005/0160702 | A1 | | 7/2005 | Perreault et al. |
| 2008/0028168 | A1 | | 1/2008 | Muraoka |
| 2008/0278922 | A1 | | 11/2008 | Wimmer |
| 2010/0103631 | A1 | | 4/2010 | Tong et al. |
| 2011/0269319 | A1 | | 11/2011 | Cheng |

FOREIGN PATENT DOCUMENTS

| | | |
|---|---|---|
| JP | 10-214234 | 8/1998 |
| JP | 11-353237 | 12/1999 |
| JP | 2001-242951 | 9/2001 |
| JP | 2008-033593 | 2/2008 |
| JP | 2011-129011 | 6/2011 |

OTHER PUBLICATIONS

Japan Office action, mail date is Oct. 4, 2011.

* cited by examiner

TERMINAL UNIT

CROSS-REFERENCE TO RELATED APPLICATION

This is a continuation application of U.S. patent application Ser. No. 13/596,762, filed Aug. 28, 2012, which claims priority of Japanese Application No. 2011-194187, filed on Sep. 6, 2011. The disclosures of these documents, including the specifications, drawings and claims, are incorporated herein by reference in their entirety.

BACKGROUND OF THE INVENTION

1. Field of the Invention

The present invention relates to a terminal unit with security features.

2. Background of the Invention

High security is usually required to handle customer's important personal information in a conventional settlement terminal unit that settles accounts using a credit card or an IC card. For example, a conventional unit has an inner surface of a unit case (security case) on which a printed pattern wiring film (FPC) is laminated, and if someone tries to make a hole in this security case, somewhere in the wiring pattern of the FPC is to be cut off. In this case, very crucial information such as personal identification numbers are stored on an information memory, and if the wiring pattern of the FPC is cut, power supply is blocked and data on the information memory is erased.

Japanese Patent Laid-Open 11-353237 discloses such prior arts, for example.

Unfortunately, in a conventional unit, if the entire inner surface of a case is covered with an FPC, it is possible to secure high security, but manufacturing cost increases and efficiency becomes deteriorated because a wide range thereof is needed to be covered with the FPC. On the other hand, if part of the inner surface of the case is covered, it is possible to reduce manufacturing cost at a lower level, but invasion may be made from a portion uncovered with the FPC (security hole) of the case, so that it is difficult to satisfy high security required for such a unit. In addition, there is another difficulty that the FPC is disposed closely to the case, so that malfunction may be caused when the FPC becomes broken due to falling of the unit or the like.

The present invention has been made to solve the above mentioned conventional difficulties, and has an object to provide a terminal unit capable of realizing efficient enhancement of security against an attack to attempt an unjust access to electronic components.

SUMMARY OF THE INVENTION

The terminal unit according to the present invention is configured such that the terminal unit includes a first board; an electronic component on which information to be protected is stored, the electronic component implemented on the first board; a second board disposed above the first board and covering an upper side of the electronic component; a frame member disposed between the first board and the second board, the frame member having a wall portion surrounding the electronic component; and a flexible printed circuit so disposed as to cover an outer side of the wall portion and so wound around the frame member from an upper side and a lower side of the wall portion as to cover at least part of an inner side of the wall portion. A wiring pattern formed on the flexible printed circuit is electrically connected to the electronic component, and the information to be protected that is stored on the electronic component becomes unreadable if part of the wiring pattern is cut-off or short-circuited.

In this configuration, the electronic component on which the information to be protected is stored is surrounded by the frame member between the first board and the second board, and this frame member is covered with the flexible printed circuit, so that the wiring pattern of the flexible printed circuit is electrically connected to the electronic component. If an unjust access to the electronic component is attempted, and part of the wiring pattern of the flexible printed circuit is cut off or short-circuited, the information to be protected that is stored on the electronic component becomes unreadable. In this case, the flexible printed circuit not only covers the outer side of the wall portion but also is wound around the frame member from the upper side and the lower side of the wall portion so as to cover the inner side of the wall portion. Therefore, even if an unjust access to the electronic components is attempted by inserting a knife between the board (first board or second board) and the frame member, the wiring pattern of the flexible printed circuit is cut off or short-circuited, so that the information to be protected that is stored on the electronic component becomes unreadable. Accordingly, it is possible to enhance security against an attack to attempt an unjust access to the electronic components, in particular against an attack to insert a knife between the board and the frame member. In this case, only portions necessary and sufficient for protecting important portions (electronic components on which the information to be protected is stored) is covered with the flexible printed circuit, which is more efficient than in the case of covering the entire inner surface of a conventional case, and which provides higher security compared to the case of covering part of the inner surface of a conventional case.

In the terminal unit of the present invention, the flexible printed circuit includes a first board attachment electrically connected to the first board; and a second board attachment electrically connected to the second board. The frame member includes a first rubber installation portion where a first rubber member is installed at a position corresponding to the first board attachment; and a second rubber installation portion where a second rubber member is installed at a position corresponding to the second board attachment, the first board attachment is pushed against the first board by elastic force of the first rubber member, and the second board attachment is pushed against the second board by elastic force of the second rubber member. The first board and the second board are electrically connected to each other through the flexible printed circuit, and if part of the wiring pattern of the flexible printed circuit is cut off or short-circuited, the information to be protected that is stored on the electronic component becomes unreadable.

In this configuration, the first board attachment of the flexible printed circuit is pushed against the first board by the first rubber member, and the second board attachment of the flexible printed circuit is pushed against the second board by the second rubber member. In this way, the first board and the second board are electrically connected to each other through the flexible printed circuit by utilizing elastic force of the rubber members (first rubber member and second rubber member). If an unjust access to the electronic components is attempted, and part of the wiring pattern of the flexible printed circuit is cut off or short-circuited, the information to be protected that is stored on the electronic component becomes unreadable.

In the terminal unit of the present invention, a first conducting layer is provided on at least a surface of the first rubber member that comes in contact with the second board, and the second board is provided with a first circuit pattern electrically connected through the first conducting layer, and if the first rubber member is moved apart from the second board, and part of the first circuit pattern is cut off or short-circuited, the information to be protected that is stored on the electronic component becomes unreadable.

In this configuration, the first circuit pattern formed on the second board is electrically connected through the first conducting layer of the first rubber member. If an unjust access to the electronic components is attempted, and the first rubber member is moved apart from the second board, part of the first circuit pattern is cut off or short-circuited, so that the information to be protected that is stored on the electronic component becomes unreadable.

In the terminal unit of the present invention, a second conducting layer is provided on at least a surface of the second rubber member that comes in contact with the first board, and the first board is provided with a second circuit pattern electrically connected through the second conducting layer, and if the second rubber member is moved apart from the first board, and part of the second circuit pattern is cut off or short-circuited, the information to be protected that is stored on the electronic component becomes unreadable.

In this configuration, the second circuit pattern formed on the first board is electrically connected through the second conducting layer of the second rubber member. If an unjust access to the electronic components is attempted, and the second rubber member is moved apart from the first board, part of the second circuit pattern is cut off or short-circuited, the information to be protected that is stored on the electronic components becomes unreadable.

In the terminal unit of the present invention, a third rubber member provided with third conducting layers on both surfaces of the third rubber member that come in contact with the first board and the second board, respectively, is disposed between the first board and the second board, and the first board and the second board are respectively provided with third circuit patterns electrically connected through the respective third conducting layers, and if this rubber member is moved apart from the first board or the second board, and part of the third circuit patterns is cut off or short-circuited, the information to be protected that is stored on the electronic component becomes unreadable.

In this configuration, the third rubber member provided with the third conducting layers on the both surfaces of the third rubber member that come in contact with the first board and the second board, respectively, is disposed between the first board and the second board, and the third circuit patterns formed on the first board and the second board, respectively, are electrically connected through the respective third conducting layers. If an unjust access to the electronic components is attempted, and the third rubber member is moved apart from the first board or the second board, and part of the third circuit patterns is cut off or short-circuited, the information to be protected that is stored on the electronic component becomes unreadable.

In the terminal unit of the present invention, the flexible printed circuit is coated with resin material in a black color.

In this configuration, the flexible printed circuit is coated with resin material in a black color, so that it is difficult to visually recognize the wiring pattern formed on the flexible printed circuit from the outside. Accordingly, it is possible to enhance security against an attack to insert a knife in the wiring pattern.

The present invention provides a terminal unit capable of realizing efficient enhancement of security against an attack to attempt an unjust access to electronic components.

DETAILED DESCRIPTION OF THE PREFERRED EMBODIMENTS

Hereinafter, description will be provided on the terminal unit according to the embodiment of the present invention with reference to the drawings. The present embodiment exemplifies the case of a terminal unit used as a settlement terminal unit or the like that settles accounts using a credit card or an IC card.

Figure 1:
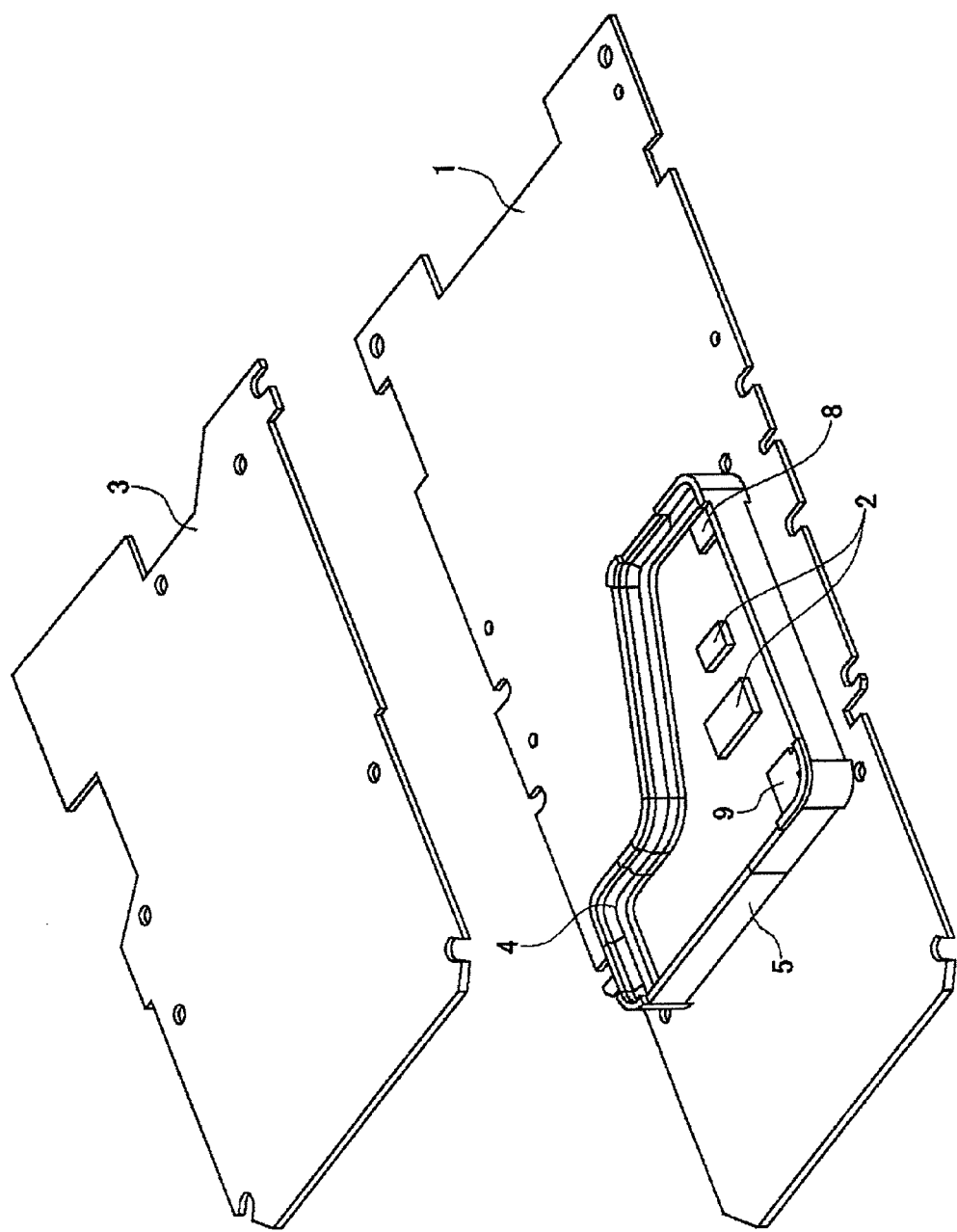
FIG. 1 is a perspective view of illustrating a main configuration of a terminal unit according to the embodiment of the present invention.

The configuration of the terminal unit according to the embodiment of the present invention will now be described with reference to the drawings. In the following description, only the characterized configuration (main configuration) in the present invention will be mainly described, and description on the entire configuration of the terminal unit will be omitted. FIG. 1 is an explanatory drawing of illustrating the main configuration of the terminal unit according to the present embodiment. As illustrated in FIG. 1, in the terminal unit of the present embodiment, the electronic components 2 such as memories on which information to be protected is stored are implemented on the main board 1. Above the upper surface of the main board 1, the sub-board 3 is disposed so as to cover above the electronic components 2. The sub-board 3 is disposed so as to be opposite to a surface of the main board 1 where the electronic component 2 is implemented. The frame member 4 is disposed on the main board 1 so as to surround the electronic components 2. The flexible printed circuit 5 (FPC) is wound around the frame member 4. The wiring pattern 6 (snake pattern) is formed throughout the flexible printed circuit 5 (see FIG. 2). The flexible printed circuit 5 is coated with resin material in a black or dark color (such as PET in a black color, for example).

Figure 2:
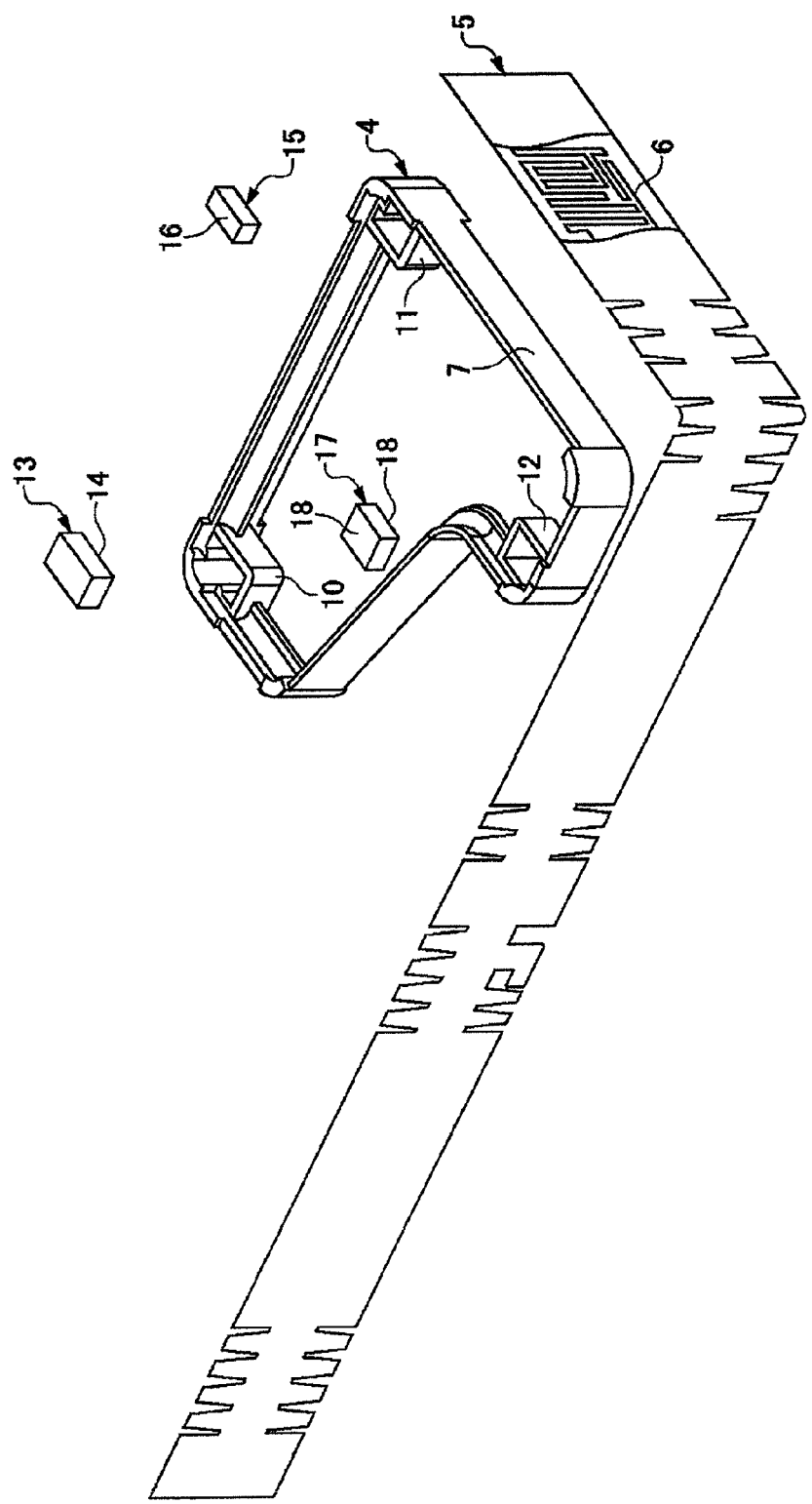
FIG. 2 is a perspective view of illustrating a frame member and a flexible printed circuit.
Figure 3:
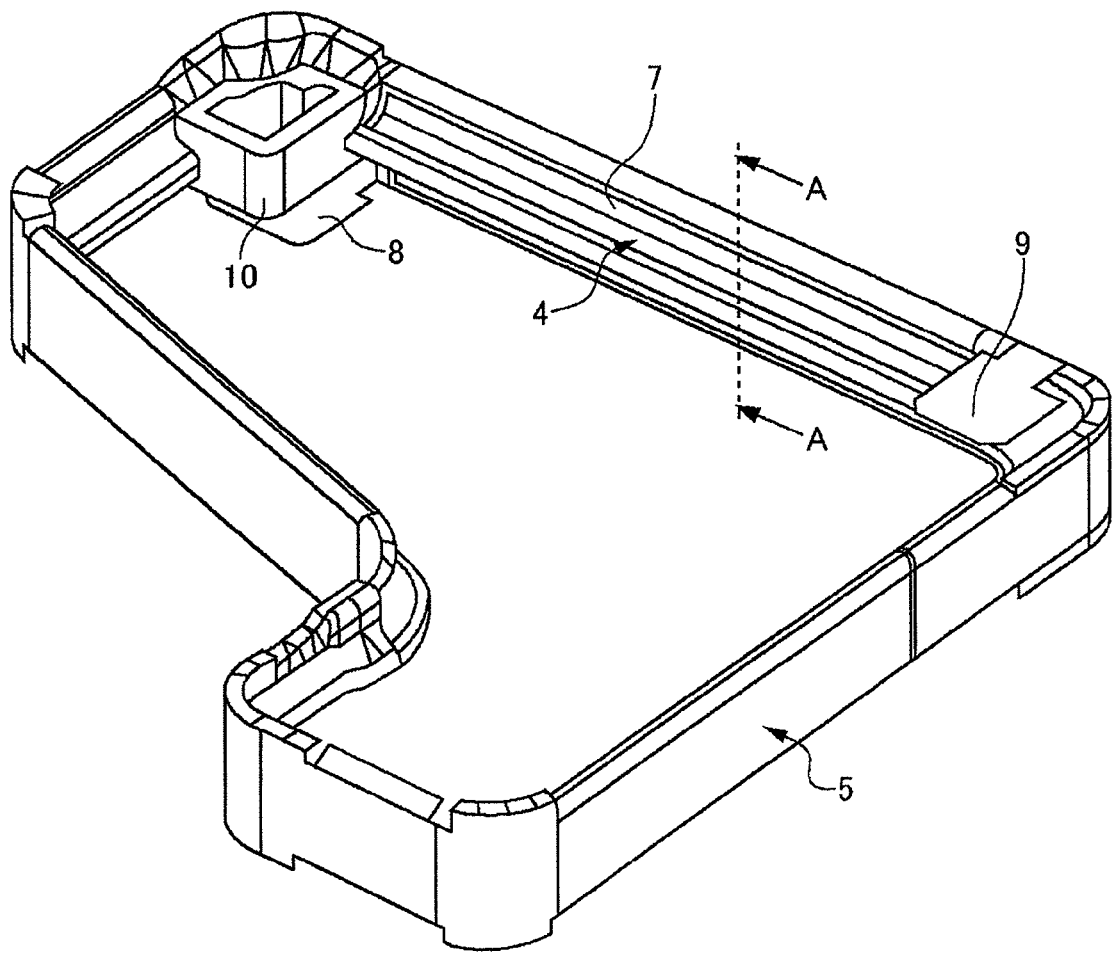
FIG. 3 is a perspective view of illustrating a state in which the flexible printed circuit is wound around the frame member.
Figure 4:
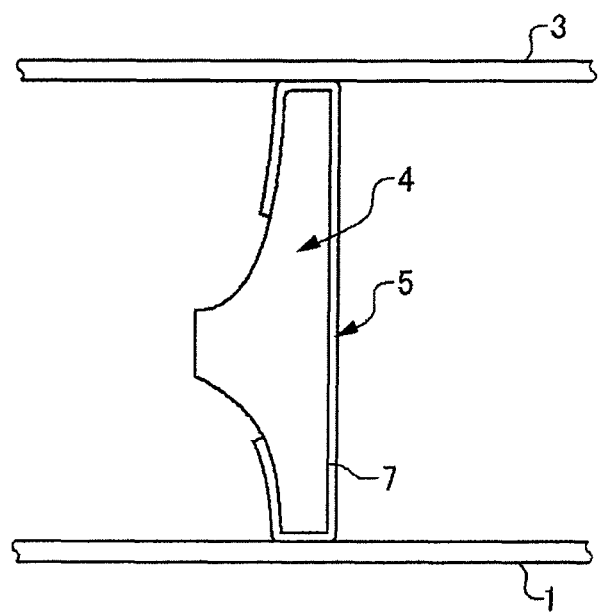
FIG. 4 is a cross sectional view taken along line A-A of FIG. 3.

With reference to FIG. 2 to FIG. 4, detailed description will now be provided on the configuration of the frame member 4 and the flexible printed circuit 5. As illustrated in FIG. 2 and FIG. 3, the frame member 4 includes the wall portion 7 surrounding the electronic components 2 between the main board 1 and the sub-board 3. In FIG. 2 and FIG. 3, illustrations of the main board 1 and the sub-board 3 are omitted for convenience of explanation. As illustrated in FIG. 4, the flexible printed circuit 5 is so disposed as to cover the outer side (right side in FIG. 4) of the wall portion 7, and is also so wound around the frame member 4 from the upper side and the lower side (upper and lower sides in FIG. 4) of the wall portion 7 as to cover at least part of the inner side (left side in FIG. 4) of the wall portion 7. The flexible printed circuit 5 is wound around the frame member 4 from both edges of the wall portion 7 so as to cover at least part of an inner side of the wall portion 7. One of both edges of the wall portion 7 is opposite to the main board 1, and the other of both edges of the wall portion 7 is opposite to the sub-board 3. In other words, one of both edges of the wall portion 7 faces the main board 1, and the other of both edges of the wall portion 7 faces the sub-board 3.

As illustrated in FIG. 1 and FIG. 3, the main board attachment 8 electrically connected to the main board 1 and the sub-board attachment 9 electrically connected to the sub-board 3 are disposed at the flexible printed circuit 5 in such a manner that the main board attachment 8 and the sub-board attachment 9 extend from the flexible printed circuit 5. As illustrated in FIG. 2, there are disposed, to the frame member 4, three box-shaped rubber installation portions 10 to 12 (first rubber installation portion 10, second rubber installation portion 11 and third rubber installation portion 12). These rubber installation portions (first rubber installation portion 10, second rubber installation portion 11 and third rubber installation portion 12) may be manufactured integrally with the frame member 4, or may be installed to the frame member 4 after manufactured as separate members.

The first rubber installation portion 10 is disposed at a position corresponding to the main board attachment 8, and the first rubber member (i.e., a rubber corner member) 13 is installed in the first rubber installation portion 10. The first rubber member 13 is in contact with the main board attachment 8, and the main board attachment 8 is pushed against the main board 1 by elastic force of the first rubber member 13, so that the main board 1 and the main board attachment 8 are electrically connected to each other. The first rubber member 13 is also in contact with the sub-board 3, and the conducting layer 14 is disposed on a surface of the first rubber member 13 that comes in contact with the sub-board 3. See FIGS. 1 and 2. The sub-board 3 is provided with a first circuit pattern (not illustrated, and which is a circuit pattern in addition to other circuit patterns) electrically connected through the conducting layer 14 of the first rubber member 13.

The second rubber installation portion 11 is disposed at a position corresponding to the sub-board attachment 9, and the second rubber member 15 (i.e., a second rubber corner member) is installed in the second rubber installation portion 11. The second rubber member 15 is in contact with the sub-board attachment 9, and the sub-board attachment 9 is pushed against the sub-board 3 by elastic force of the second rubber member 15, so that the sub-board 3 and the sub-board attachment 9 are electrically connected to each other. The second rubber member 15 is also in contact with the main board 1, and the conducting layer 16 is formed on a surface of the second rubber member 15 that comes in contact with the main board 1. See FIGS. 1 and 2. The main board 1 is provided with the second circuit pattern (not illustrated, and which is a further circuit pattern) electrically connected through the conducting layer 16 of the second rubber member 15.

The third rubber installation portion 12 is disposed at any corner of the frame member 4, and the third rubber member (i.e., which is a rubber member among the other rubber members) 17 is installed in the third rubber installation portion 12. The third rubber member 17 is in contact with the main board 1 and the sub-board 3, and the conducting layers 18 are disposed on the both surfaces of the third rubber member 17 that come in contact with the main board 1 and the sub-board 3, respectively. See FIGS. 1 and 2. The main board 1 and the sub-board 3 are respectively provided with the third circuit patterns (not illustrated, and which provide one and another of the circuit patterns) electrically connected through the respective conducting layers 18 of the third rubber member 17.

Figure 5:
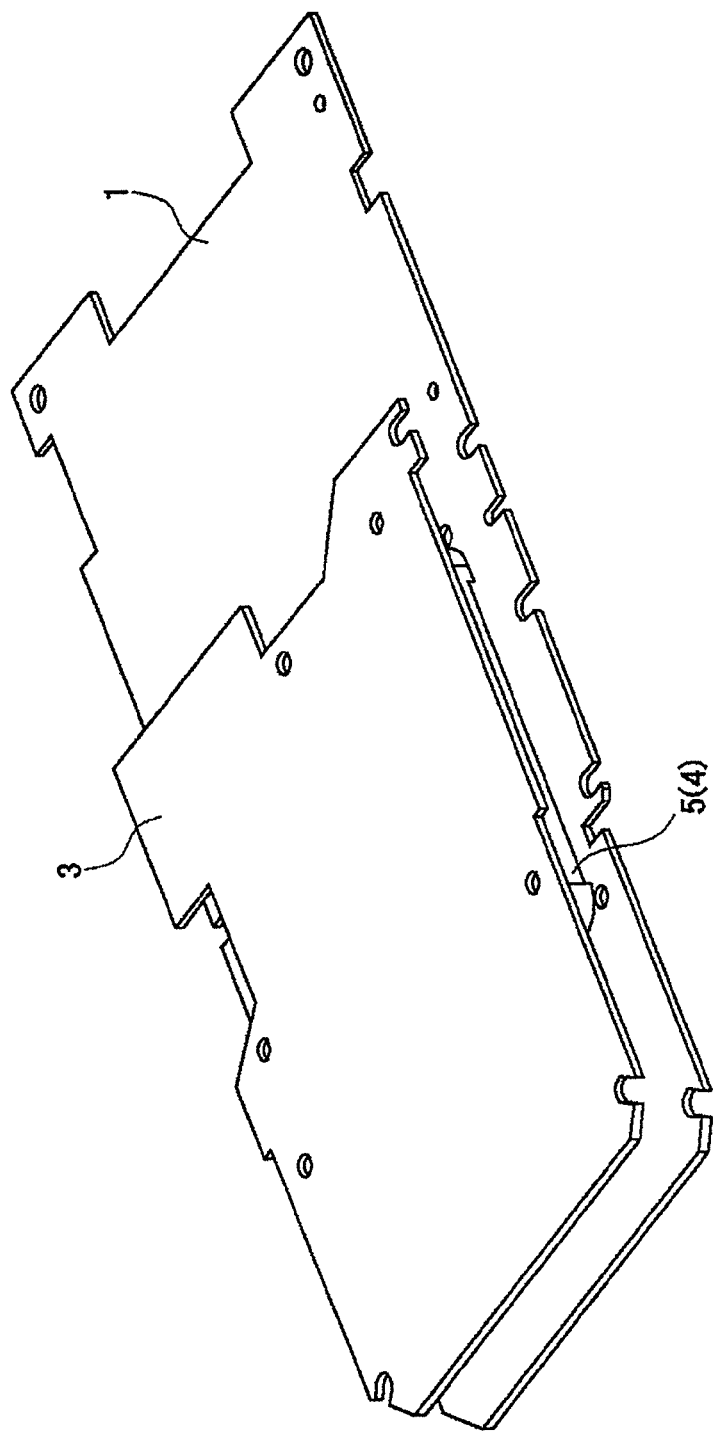
FIG. 5 is a perspective view of illustrating a state in which a sub-board overlaps a main board.

FIG. 5 illustrates a state in which the sub-board 3 overlaps the main board 1. In this state, the main board 1 and the main board attachment 8 are electrically connected to each other, and the sub-board 3 and the sub-board attachment 9 are also electrically connected to each other. Specifically, the main board 1 and the sub-board 3 are electrically connected to each other through the flexible printed circuit 5, and the wiring pattern 6 formed on the flexible printed circuit 5 and the electronic components 2 are electrically connected to each other. If part of the wiring pattern 6 on the flexible printed circuit 5 is cut off or short-circuited, the information to be protected that is stored on the electronic components 2 becomes unreadable.

If the first rubber member 13 is moved apart from the sub-board 3, and part of the first circuit pattern is cut off or short-circuited, or if the second rubber member 15 is moved apart from the main board 1, and part of the second circuit pattern is cut off or short-circuited, the information to be protected that is stored on the electronic components 2 becomes unreadable. In addition, if the third rubber member 17 is moved apart from the main board 1 or the sub-board 3, and part of the circuit pattern is cut off or short-circuited, the information to be protected that is stored on the electronic components 2 also becomes unreadable.

A method of making unreadable the information to be protected that is stored on the electronic components 2 includes, for example, a method of erasing the information or a method of applying predetermined encryption to the information or the like.

According to this terminal unit of the embodiment of the present invention, it is possible to realize efficient enhancement of security against an attack to attempt an unjust access to the electronic component 2.

Specifically, in the present embodiment, the electronic components 2 on which the information to be protected is stored are surrounded by the frame member 4 between the main board 1 and the sub-board 3, and the frame member 4 is covered with the flexible printed circuit 5 so that the wiring pattern 6 of the flexible printed circuit 5 and the electronic components 2 are electrically connected to each other. If an unjust access is attempted to the electronic components 2, and part of the wiring pattern 6 of the flexible printed circuit 5 is cut off or short-circuited, the information to be protected that is stored on the electronic components 2 becomes unreadable. In this case, the flexible printed circuit 5 not only covers the outer side of the wall portion 7 but also is wound around the frame member 4 from the upper side and the lower side of the wall portion 7 so as to cover the inner side of the wall portion 7. Therefore, even if an unjust access to the electronic components 2 is attempted by inserting a knife between the board (main board 1 or sub-board 3) and the frame member 4, the wiring pattern 6 of the flexible printed circuit 5 is cut off or short-circuited, so that the information to be protected that is stored on the electronic components 2 becomes unreadable. Accordingly, it is possible to enhance security against an attack to attempt an unjust access to the electronic components 2, in particular against an attack to insert a knife between the board and the frame member 4. In this case, only portions necessary and sufficient for protecting important portions (electronic components 2 on which the information to be protected is stored) is covered with the flexible printed circuit 5, which is more efficient than in the case of covering the entire inner surface of a conventional case, and which provides higher security compared to the case of covering part of the inner surface of a conventional case.

In the present embodiment, the main board attachment 8 of the flexible printed circuit 5 is pushed against the main board 1 by the first rubber member 13, and the sub-board attachment 9 of the flexible printed circuit 5 is pushed against the sub-board 3 by the second rubber member 15. In this way, the main board 1 and the sub-board 3 are electrically connected to each other through the flexible printed circuit 5 by utilizing elastic force of the rubber members (first rubber member 13 and second rubber member 15). If an unjust access to the electronic components 2 is attempted, and part of the wiring pattern 6 of the flexible printed circuit 5 is cut off or short-circuited, the information to be protected that is stored on the electronic components 2 becomes unreadable.

In the present embodiment, the first circuit pattern formed on the sub-board 3 is electrically connected through the conducting layer 14 of the first rubber member 13. If an unjust access to the electronic components 2 is attempted and the first rubber member 13 is moved apart from the sub-board 3, part of the first circuit pattern is cut off or short-circuited, so that the information to be protected that is stored on the electronic components 2 becomes unreadable.

In the present embodiment, the second circuit pattern formed on the main board 1 is electrically connected through the conducting layer 16 of the second rubber member 15. If an unjust access to the electronic components 2 is attempted, and the second rubber member 15 is moved apart from the main board 1, part of the second circuit pattern is cut off or short-circuited, so that the information to be protected that is stored on the electronic components 2 becomes unreadable.

In the present embodiment, there is disposed between the main board 1 and the sub-board 3 the third rubber member 17 provided with the conducting layers 18 on the both surfaces of third rubber member 17 that come in contact with the main board 1 and the sub-board 3, respectively, and the third circuit patterns formed on the main board 1 and the sub-board 3 are electrically connected through the conducting layers 18 of the third rubber member 17, respectively. If an unjust access to the electronic components 2 is attempted and the third rubber member 17 is moved apart from the main board 1 or the sub-board 3, part of the third circuit patterns of the main board 1 or the sub-board 3 is cut off or short-circuited, so that the information to be protected that is stored on the electronic components 2 becomes unreadable.

In the present embodiment, the flexible printed circuit 5 is coated with resin material in a black color, so that it is difficult to visually recognize the wiring pattern 6 formed on the flexible printed circuit 5 from the outside. Accordingly, it is possible to enhance security against an attack to insert a knife between the wiring pattern 6.

The embodiment of the present invention has been described using the above examples, but the scope of the present invention is not limited to this, and may be modified and changed for any purpose within the scope set forth in the claims.

As described above, the terminal unit according to the present invention attains an advantageous effect to efficiently enhance security against an attack to attempt an unjust access to electronic components, and is useful as a settlement terminal unit that settles accounts using a credit card or an IC card.

What is claimed is:

1. A terminal apparatus, comprising:
   a first board;
   an electronic component on which information to be protected is stored, the electronic component being provided on a surface of the first board;
   a second board which is disposed to cover the surface of the first board that is provided with the electronic component;
   a frame member which is disposed between the first board and the second board, the frame member having a wall portion that extends along a path that defines an enclosed space;
   a rubber member which is provided between the first board and the second board, the rubber member being provided with a first conducting layer on a first surface of the rubber member that comes in contact with the first board and a second conducting layer on a second surface of the rubber member that comes in contact with the second board;
   wherein the electronic component and the rubber member are positioned within the enclosed space, and
   wherein the second board is provided with one circuit pattern which is electrically connected through the second conducting layer, and
   the first board provided with another circuit pattern which is electrically connected through the first conducting layer.

2. The terminal apparatus according to claim 1, wherein when the rubber member is moved apart from the first board or the second board, the information to be protected that is stored on the electronic component becomes unreadable.

3. The terminal apparatus according to claim 1, further comprising a first rubber corner member provided at a corner of the frame member,
   wherein a third conducting layer is provided on at least a surface of the first rubber corner member that comes in contact with the second board, and the second board is provided with an additional circuit pattern which is electrically connected through the third conducting layer, and
   when the first rubber corner member is moved apart from the second board, the information to be protected that is stored on the electronic component becomes unreadable.

4. The terminal apparatus according to claim 3, further comprising a second rubber corner member provided at another corner of the frame member,
   wherein a fourth conducting layer is provided on at least a surface of the second rubber corner member that comes in contact with the first board, and the first board is provided with a further circuit pattern which is electrically connected through the fourth conducting layer, and
   when the second rubber corner member is moved apart from the first board, the information to be protected that is stored on the electronic component becomes unreadable.

5. The terminal apparatus according to claim 1, wherein when part of the one circuit pattern or the another circuit pattern is cut off or short-circuited, the information to be protected that is stored on the electronic component becomes unreadable.

6. The terminal apparatus according to claim 1, wherein when part of the one circuit pattern or the another circuit pattern is cut off or short-circuited,
   the information to be protected that is stored on the electronic component is erased.

7. The terminal apparatus according to claim 1, wherein when part of the one circuit pattern or the another circuit pattern is cut off or short-circuited,
   the information to be protected that is stored on the electronic component is applied predetermined encryption.

8. The terminal apparatus according to claim 1, wherein the first conducting layer directly connects only the first board, and the second conducting layer directly connects only the second board.

9. The terminal apparatus according to claim 1, further comprising
a rubber installation portion positioned within the enclosed space and having a through hole in which the rubber member is inserted.

10. The terminal apparatus according to claim 9, wherein the rubber installation portion is manufactured integrally with the frame member.

11. The terminal apparatus according to claim 9, wherein the rubber installation portion is a separate member from the frame member.

12. A terminal apparatus, comprising:
a first board;
an electronic component on which information to be protected is stored, the electronic component being provided on a surface of the first board;
a second board which is disposed to be opposite to an upper side of the first board so as to cover an upper side of the electronic component;
a frame member which is disposed between the first board and the second board, the frame member having a wall portion that extends along a path that defines an enclosed space;
a rubber member which is provided between the first board and the second board, the rubber member being provided with conducting layers on two surfaces of the rubber member that come in contact with the first board and the second board respectively;
wherein the electronic component and the rubber member are positioned within the enclosed space, and
wherein the first board and the second board are respectively provided with circuit patterns which are electrically connected through the respective conductive layers.

13. The terminal apparatus according to claim 12, wherein
when the rubber member is moved apart from the first board or the second board, the information to be protected that is stored on the electronic component becomes unreadable.

14. The terminal apparatus according to claim 12, further comprising a first rubber corner member provided at a corner of the frame member,
wherein a first conducting layer is provided on at least a surface of the first rubber corner member that comes in contact with the second board, and the second board is provided with one circuit pattern, among the circuit patterns, which is electrically connected through the first conducting layer, and
when the first rubber corner member is moved apart from the second board, the information to be protected that is stored on the electronic component becomes unreadable.

15. The terminal apparatus according to claim 14, further comprising a second rubber corner member provided at another corner of the frame member,
wherein a second conducting layer is provided on at least a surface of the second rubber corner member that comes in contact with the first board, and the first board is provided with another circuit pattern, among the circuit patterns, which is electrically connected through the second conducting layer, and
when the second rubber corner member is moved apart from the first board, the information to be protected that is stored on the electronic component becomes unreadable.

* * * * *